United States Patent
Solyom et al.

(10) Patent No.: US 9,020,680 B2
(45) Date of Patent: Apr. 28, 2015

(54) TRAVEL DIRECTION DETERMINATION METHOD AND SYSTEM

(71) Applicant: Volvo Car Corporation, Goeteborg (SE)

(72) Inventors: Stefan Solyom, Olofstorp (SE); Martin Nordvall, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 41 days.

(21) Appl. No.: 13/781,958

(22) Filed: Mar. 1, 2013

(65) Prior Publication Data

US 2013/0231820 A1 Sep. 5, 2013

(30) Foreign Application Priority Data

Mar. 5, 2012 (EP) .................................. 12158044

(51) Int. Cl.
 *G08G 1/00* (2006.01)
 *G05D 1/02* (2006.01)

(52) U.S. Cl.
 CPC ............... *G08G 1/00* (2013.01); *G05D 1/0293* (2013.01); *G05D 2201/0213* (2013.01)

(58) Field of Classification Search
 CPC . G05D 1/093; G05D 2201/0213; G08G 1/00; B60K 31/0008; B60W 30/16
 USPC .......................... 701/2, 23, 96, 300; 340/903
 See application file for complete search history.

(56) References Cited

U.S. PATENT DOCUMENTS

| | | | |
|---|---|---|---|
| 6,058,347 A * | 5/2000 | Yamamura et al. | 701/96 |
| 6,175,799 B1 * | 1/2001 | Tsutsumi et al. | 701/96 |
| 6,289,273 B1 | 9/2001 | Boettiger et al. | |

FOREIGN PATENT DOCUMENTS

DE 4133882 4/1992

OTHER PUBLICATIONS

European Search Report for Application No. 12158044.3 dated Aug. 8, 2012.
T. Fujioka et al., Vehicle Following Control in Lateral Direction for Platooning, Vehicle System Dynamics Supplement 28 (1998), pp. 422-437.

* cited by examiner

*Primary Examiner* — Marthe Marc-Coleman
(74) *Attorney, Agent, or Firm* — Brooks Kushman P.C.

(57) ABSTRACT

A method for determining a direction of travel for a following vehicle ensures that the following vehicle follows a path indicative of that of a target vehicle. The target vehicle extends in longitudinal (X) and lateral (Y) directions, the longitudinal direction (X) corresponding to an intended direction of travel of the following vehicle. The method may include determining a measured lateral offset ($\Delta Y_{measure}$) between the following and target vehicles. The method may also include measuring a lateral position change parameter corresponding to an actual performed, ongoing and/or impending lateral position change of the following vehicle, an actual performed, ongoing and/or impending lateral position change of the target vehicle, or a combination thereof. The method may further include determining a lateral offset modification measure ($O_Y$) using the lateral position change parameter, and using the measured lateral offset ($\Delta Y_{measure}$) and lateral offset modification measure ($O_Y$) when determining the direction of travel.

20 Claims, 7 Drawing Sheets

TRAVEL DIRECTION DETERMINATION METHOD AND SYSTEM

CROSS-REFERENCE TO RELATED APPLICATIONS

This application claims foreign priority benefits under 35 U.S.C. §119(a)-(d) to European patent application number EP 12158044.3, filed Mar. 5, 2012, which is incorporated herein by reference in its entirety.

TECHNICAL FIELD

The present disclosure relates to a method, system and computer program product for determining a direction of travel for a following vehicle.

BACKGROUND

Recently, an increased interest has been directed towards the technical field of target path following. Within the field of target path following, a following vehicle determines the relative position to a target vehicle and the following vehicle is automatically controlled so as to, at least to some extent, follow the path of the target vehicle.

Purely by way of example, the concept of target path following may be used in a vehicle train, which train includes a plurality of vehicles each one of which being adapted to, at least to some extent, follow the path of the vehicle in front.

In order to control a following vehicle such that it more or less follows the target vehicle, the relative distances, longitudinally as well as laterally, between the two vehicles are generally determined and the steering angle of the following vehicle is often controlled such that the relative lateral distance between the following vehicle and the path of the target vehicle is below a predetermined threshold value.

In order to control a following vehicle such that it more or less follows the target vehicle, the relative distances, longitudinally as well as laterally, between the two vehicles are generally determined and the steering angle of the following vehicle is often controlled such that the relative lateral distance between the following vehicle and the path of the target vehicle is below a predetermined threshold value.

In an attempt to reduce the magnitude of the deviation of the following vehicle's path from the target path during cornering, DE 41 33 882 A1 proposes a control method in which a steering angle of the following vehicle is determined by taking the relative longitudinal distance, as well as the relative yaw angle, of the following and target vehicle into account.

However, the control method as described in DE 41 33 882 A1 may not sufficiently reduce the deviation of the following vehicle's path from the target path during cornering.

SUMMARY

One object of the disclosure is to reduce or ameliorate at least one of the disadvantages of the prior art systems and/or methods, or to provide a useful alternative.

This object is achieved by a method for determining a direction of travel for a following vehicle according to the claims.

As such, the present disclosure relates to a method for determining a direction of travel for a following vehicle in order to ensure that the following vehicle follows a path that is indicative of a vehicle path of a target vehicle. The target vehicle extends in a longitudinal direction and a lateral direction, wherein the longitudinal direction corresponds to an intended direction of travel of the following vehicle.

The method comprises:
  determining a measured lateral offset between the following vehicle and the target vehicle;
  measuring at least one lateral position change parameter corresponding to an actual performed and/or ongoing and/or impending lateral position change of the following vehicle, an actual performed and/or ongoing and/or impending lateral position change of the target vehicle, or a combination thereof;
  determining a lateral offset modification measure using the at least one lateral position change parameter, and
  using the measured lateral offset and the lateral offset modification measure when determining the direction of travel.

The method according to the above implies that an actual position change, be it a performed, ongoing or impending position change, of at least one of the following and leading vehicles is used when determining a lateral offset modification measure. As such, the method according to the above implies that specific driving conditions, rather than empirical data, are used when determining the direction of travel. This, in turn, implies a more flexible assessment of the direction of travel which, in turn, may result in an improved accuracy of the travel direction method.

As used herein the expression "lateral position change parameter" may relate to information indicative of at least one of the following: the position (longitudinal and/or lateral) of the following vehicle and/or the target vehicle; the relative distance (longitudinal and/or lateral) between the following vehicle and the target vehicle; the slip angle of the following vehicle and/or the target vehicle; the curve radius of a curve that the following vehicle and/or the target vehicle follows; the velocity (longitudinal and/or lateral) of the following vehicle and/or the target vehicle; the acceleration (longitudinal and/or lateral) of the following vehicle and/or the target vehicle and the yaw angle and/or the yaw rate of the following vehicle and/or the target vehicle.

Optionally, a lateral offset modification measure may be determined using a plurality of lateral position change parameters.

determining a first portion of the lateral offset modification measure, which first portion is indicative of a slip value comprising a slip angle of the following vehicle, a slip angle of the target vehicle, or a combination thereof.
  Optionally, the method comprises:
  determining a longitudinal distance between the following vehicle and the target vehicle;
  determining a longitudinal velocity value comprising a longitudinal velocity of the following vehicle, a longitudinal velocity of the target vehicle or a combination thereof;
  determining a lateral velocity value comprising a lateral velocity of the following vehicle, a lateral velocity of the target vehicle or a combination thereof;
  determining a first portion of the lateral offset modification measure by using a first modification relation comprising the following parameters: the longitudinal distance, the longitudinal velocity value and a lateral velocity value.
  Optionally, the method comprises:
  determining the first portion of the lateral offset modification measure by using the following formula:

$$O_{Y,1} = \Delta x \cdot \frac{v_y}{v_x}.$$

Optionally, the method comprises:
  determining a second portion of the lateral offset modification measure which second portion is indicative of a curve radius of a curve which at least one of the following vehicle and the target vehicle follows.

Optionally, the method comprises:
determining a yaw rate value comprising a yaw rate of the following vehicle, a yaw rate of the target vehicle or a combination thereof;
determining a second portion of the lateral offset modification measure by using a second modification relation comprising the following parameters: the yaw rate value, the longitudinal distance and the longitudinal velocity value.

Optionally, the method comprises:
determining the second portion of the lateral offset modification measure by using the following formula:

$$O_{Y,2} = \frac{(\Delta x)^2 \cdot \dot{\psi}}{2 \cdot v_x}.$$

Optionally, the target vehicle comprises means for transmitting, such as a wireless transmitter, a yaw rate signal indicative of the yaw rate of the target vehicle to one or more receivers located outside the target vehicle. Moreover, the method optionally further comprises:
receiving the yaw rate signal to thereby determine the yaw rate of the target vehicle.

As used herein, the expression "a combination" is intended to encompass any possible linear or non-linear combination of the parameters in question. As an example, the expression "a combination of A and B" may include the following possibilities for a combination C: C=A(1−X)+BX, 0≤X0≤1.

Optionally, the step of determining the longitudinal distance between the following vehicle and the target vehicle comprises:
determining an Euclidian distance between the following vehicle and the target vehicle;
determining an azimuth angle of the following vehicle in relation to the target vehicle, and
using the Euclidian distance and the azimuth angle in order to obtain the longitudinal distance between the following vehicle and the target vehicle.

Optionally, the following vehicle comprises a following vehicle centre of rotation and a follower sensor, the follower sensor being located at a sensor distance from the following vehicle centre of rotation. Optionally, the step of determining longitudinal distance between the following vehicle and the target vehicle comprises:
determining a first longitudinal distance between the follower sensor and the target vehicle, and
adding the sensor distance to the first longitudinal distance in order to obtain the longitudinal distance between the following vehicle and the target vehicle.

Optionally, the target vehicle comprises a target vehicle centre of rotation and a follower sensor is adapted to determine the position of a detection portion of the target vehicle relative to the following vehicle. The detection portion is located at a target distance in the longitudinal direction from the target vehicle centre of rotation. The step of determining the longitudinal distance between the following vehicle and the target vehicle comprises:
determining a relative yaw angle between the following vehicle and the target vehicle, and
utilizing the relative yaw angle and the target distance when determining the distance between the following vehicle and the target vehicle.

Optionally, the method comprises determining a modified lateral offset by modifying said measured lateral offset by said lateral offset modification measure and automatically adjusting the direction of travel for the following vehicle in order to ensure that the modified lateral offset is reduced.

Optionally, the method comprises automatically adjusting the direction of travel for the following vehicle in order to ensure that the modified lateral offset is reduced to a value below a predetermined threshold value.

Optionally, the following vehicle's direction of travel is automatically adjusted by automatically adjusting a steering angle of the following vehicle.

A second aspect of the present disclosure relates to a computer program product comprising a computer program containing computer program code executable in a computer or a processor to implement all the steps of a method according to the first aspect of the present disclosure, the product being stored on a computer-readable medium or a carrier wave.

A third aspect of the present disclosure relates to an electronic control unit, comprising a computer program product according to the second aspect of the present disclosure and arranged to execute a first parameter determination method according to the first aspect of the present disclosure.

A fourth aspect of the present disclosure relates to a vehicle, comprising an electronic control unit according to the third aspect of the present disclosure.

BRIEF DESCRIPTION OF THE DRAWINGS

The present disclosure will hereinafter be explained in greater detail by means of non-limiting examples and with reference to the appended drawings in which.

It should be noted that the appended drawings are not necessarily drawn to scale and that the dimensions of some features of the present disclosure may have been exaggerated for the sake of clarity.

DETAILED DESCRIPTION OF PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
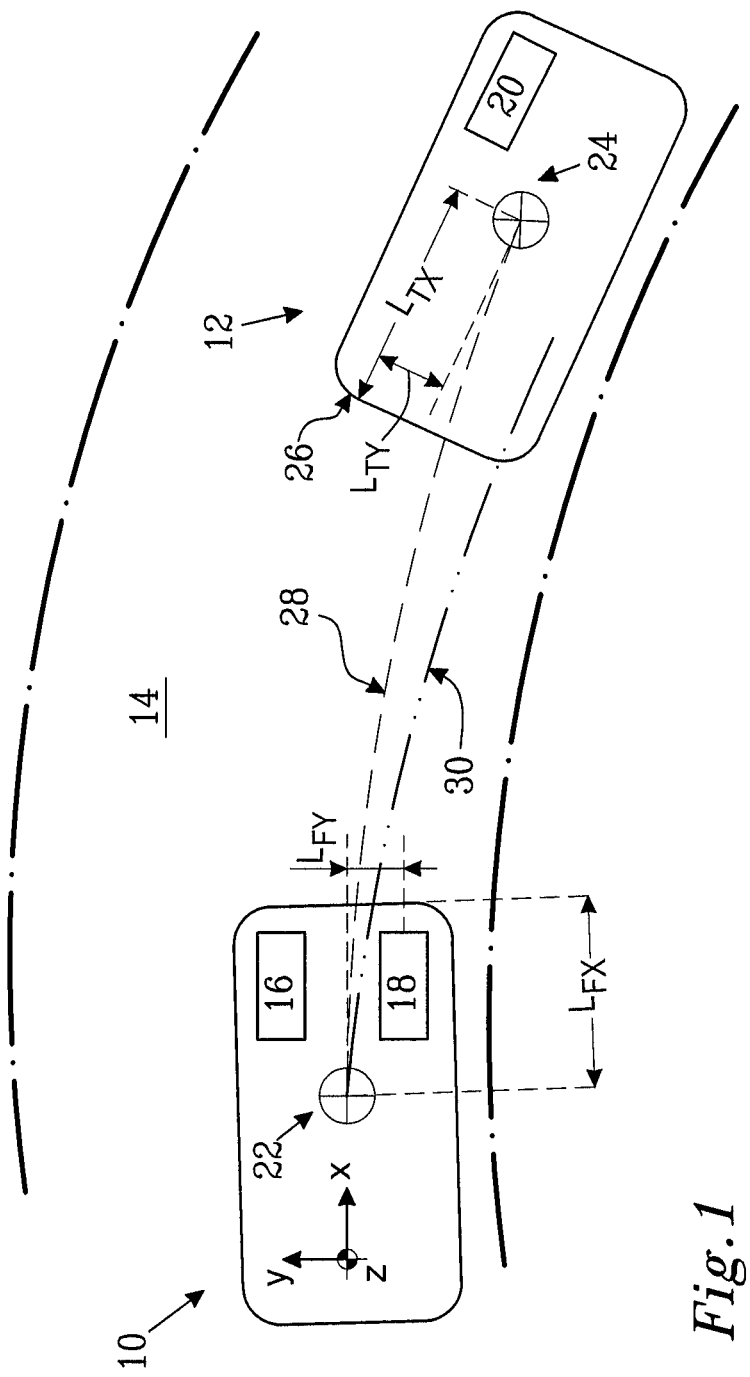
FIG. 1 illustrates a traffic situation wherein a following vehicle follows a target vehicle.

FIG. 1 illustrates a following vehicle 10 and a target vehicle 12 driving on a road 14. The target vehicle 10 extends in a longitudinal direction X and a lateral direction Y, wherein the longitudinal direction X corresponds to an intended direction of travel of the following vehicle 10. Furthermore, the following vehicle 10 extends upwards from the road 14 in a vertical direction Z. Moreover, the lateral direction Y preferably extends in a direction perpendicular to the longitudinal direction X as well as the vertical direction Z.

The following vehicle 10 comprises travel determination means 16 for determining and automatically setting a direction of travel for the following vehicle 10 in order to ensure that the following vehicle 10 follows a path that is indicative of a vehicle path of a target vehicle 12. The travel determination means 16 may for instance comprise an electronic control unit ECU which, in turn, may comprise a computer program product.

Moreover, the travel determination means 16 may preferably be connected to a following vehicle sensor assembly 18, comprising one or more sensors, of the following vehicle 10, which following vehicle sensor assembly 18 is adapted to determine at least one of the following parameters: the position (longitudinal and/or lateral) of the following vehicle 10; the relative distance (longitudinal and/or lateral) between the following vehicle 10 and the target vehicle 12; the slip angle of the following vehicle 10 and/or the target vehicle 12; the curve radius R of a curve that the following vehicle 10 and/or the target vehicle 12 follows; the velocity (longitudinal and/or lateral) of the following vehicle 10 and/or the target vehicle 12; the acceleration (longitudinal and/or lateral) of the following vehicle 10 and/or the target vehicle 12 and the yaw angle and/or the yaw rate of the following vehicle 10 and/or the target vehicle 12.

Purely by way of example, the following vehicle sensor assembly 18 may comprise a camera, a radar or lidar system or any other type of system that is adapted to locate the target vehicle 12 and to determine at least the position and/or velocity of the following vehicle 10 relative to the target vehicle 12. As another example, the following vehicle sensor assembly 18 may comprise a GPS navigation system.

The following vehicle sensor assembly 18 may also be adapted to communicate with a target vehicle sensor assembly 20. Such a communication may for instance be a direct communication between the two vehicles 10, 12 and or an indirect communication. Purely by way of example, an indirect communication between the vehicles 10, 12 may use one or more nodes (not shown) that are located in the vicinity of the road 14.

The target vehicle sensor assembly 20 may be adapted to determine at least one of the following parameters: the position of the target vehicle 12; the slip angle of the target vehicle 12, the curve radius R of a curve that the target vehicle 12 follows, the velocity (longitudinal and/or lateral) of the target vehicle 12, the acceleration (longitudinal and/or lateral) of the target vehicle 12 and the yaw angle and/or the yaw rate of the target vehicle 12. Purely by way of example, the following vehicle sensor assembly 18 and the target vehicle sensor assembly 20 may be arranged to wirelessly communicate with one another.

The above communication may be a one-way communication such that the following vehicle sensor assembly 18 is adapted to receive information transmitted only from the target vehicle sensor assembly 20, or a two-way communication such that the following vehicle sensor assembly 18 and the target vehicle sensor assembly 20 are adapted to transmit and receive information between one another.

As has been intimated hereinabove, the travel determination means 16 of the following vehicle 10 is adapted to ensure that the following vehicle 10 follows a path that is indicative of a vehicle path of a target vehicle 12.

Preferably, the travel determination means 16 is adapted to ensure that a reference point 22 of the following vehicle 10 follows a path that is indicative of the path of a reference point 24 of the target vehicle 12. Purely by way of example, the following vehicle's reference point 22 may be the centre of rotation of the following vehicle 10. In a similar vein, but also purely by way of example, the target vehicle's reference point 24 may be the centre of rotation of the target vehicle 10. However, the means may of course be adapted to use any location of the following vehicle 10 and/or the target vehicle 12 as a reference point when determining the direction of travel of the following vehicle 10.

As may be gleaned from FIG. 1, at least one sensor of the following vehicle sensor assembly 18 may be located at a longitudinal sensor distance $L_{FX}$ and a lateral sensor distance $L_{FY}$, as measured in the local dimensions of the following vehicle 10, from the reference point 22 of the following vehicle 10. In a similar vein, the following vehicle sensor assembly 18 may be adapted to determine the relative and/or absolute position of a detection portion 26 of the target vehicle 12 which detection portion 26 is not coincident with the reference point 24 of the target vehicle 12. As such, the detection portion 26 of the target vehicle 12 may be located at a longitudinal target distance $L_{TX}$ and a lateral target distance $L_{TY}$, as measured in the local dimensions of the target vehicle 12, from the reference point 24 of the target vehicle 12. Purely by way of example, the detection portion 26 of the target vehicle 12 may be a point or a portion of a rear bumper thereof (not shown in FIG. 1).

In order to determine a direction of travel for the following vehicle 10 so as to ensure that the following vehicle 10 follows a path that is indicative of a vehicle path of a target vehicle 12, the travel determination means 16 may preferably be adapted to determine at least the relative longitudinal and lateral distances between the following vehicle's reference point 22 and the target vehicle's reference point 24. The travel determination means 16 may then be adapted to adjust the steering angle of the following vehicle 10 such that the following vehicle 10 is directed towards the target vehicle's reference point 24.

FIG. 1 illustrates a traffic situation wherein the road 14 is curved. In a traffic situation such as the one illustrated in FIG. 1, the target vehicle 12 will generally, at least to some extent, follow the curvature of the road 14. Consequently, the path 28 of the target vehicle 12 will be curved with a curve radius that is at least similar to the curve radius of the road 14.

If the travel determination means 16, in the situation illustrated in FIG. 1, determines the relative longitudinal and lateral distances between the reference points 22, 24 and adjusts the steering angle of the following vehicle 10 such that the following vehicle 10 is directed towards the target vehicle's reference point 24, the following vehicle 10 may not follow the path 28 of the target vehicle 12 but rather make a shortcut to the target vehicle 12. Such a shortcut is illustrated by the dashed and double dotted line 30 in FIG. 1. A shortcut like the one illustrated in FIG. 1 is generally undesired.

In order to reduce the deviation of the following vehicle's 10 path in relation to the path of the target vehicle 12, the present disclosure proposes that, instead of steering the following vehicle 10 towards the reference point 24 of the target vehicle 12 (or any other target point of the target vehicle), the following vehicle 10 is instead steered towards a modified target position that is located at a lateral offset modification measure $O_Y$ from the reference point of the target vehicle 12. An illustration of the use of the above lateral offset modification measure $O_Y$ is illustrated in FIG. 2.

The magnitude of the lateral offset modification measure $O_Y$ is determined in relation to at least a performed and/or ongoing and/or impending lateral position change of the following vehicle 10, the target vehicle 12 or a combination thereof.

Figure 2:
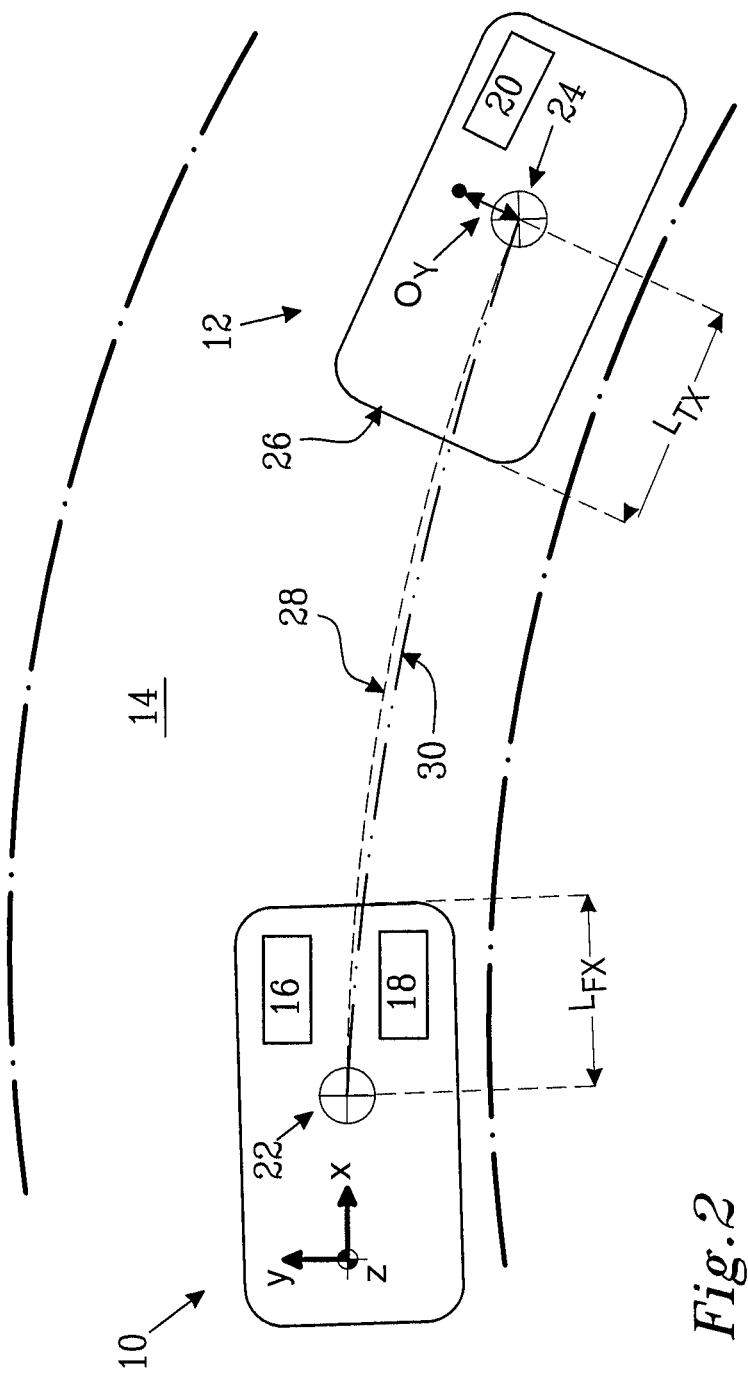
FIG. 2 illustrates a traffic situation wherein a following vehicle follows a target vehicle.

When comparing FIG. 1 and FIG. 2, it may be realized that the path 30 of the following vehicle 10 in FIG. 2 is much closer to the path 28 of the target vehicle 12 as compared to the FIG. 1 scenario.

Figure 3:
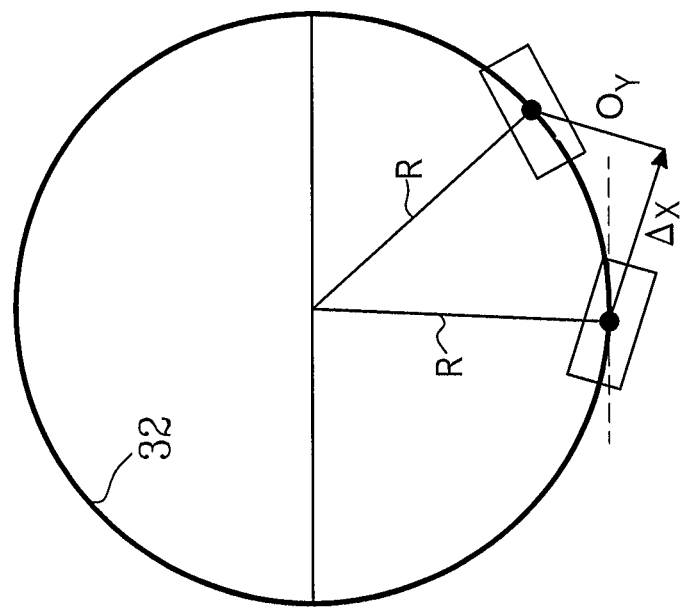
FIG. 3 illustrates a traffic situation wherein a following vehicle follows a target vehicle on a circular road.

As such, and with reference to FIG. 3, the present disclosure proposes a method for determining a direction of travel for a following vehicle 10 in order to ensure that the following vehicle 10 follows a path that is indicative of a vehicle path 28 of a target vehicle 12.

The method comprises:
determining a measured lateral offset $\Delta Y_{measure}$ between the following vehicle 10 and the target vehicle 12;
measuring at least one lateral position change parameter corresponding to an actual performed and/or ongoing and/or impending lateral position change of the following vehicle, an actual performed and/or ongoing and/or impending lateral position change of the target vehicle, or a combination thereof;
determining a lateral offset modification measure using the at least one lateral position change parameter, and
using the measured lateral offset $\Delta Y_{measure}$ and the lateral offset modification measure $O_Y$ when determining the direction of travel.

An example of how the lateral offset modification measure $O_Y$ may be determined is presented hereinbelow. The below presentation uses a travelling scenario in which both the following vehicle 10 and the target vehicle 12 travel along a road 14 that has a circular extension. However, it should be noted that the method discussed hereinbelow would be equally applicable for any other type of road extension.

Moreover, in the example discloses hereinbelow, the measured lateral offset $\Delta Y_{measure}$ and the lateral offset modification measure $O_Y$ are used for determining the direction of travel by determining a modified lateral offset $\Delta Y_{mod}$. The modified lateral offset $\Delta Y_{mod}$ is obtained by modifying the measured lateral offset $\Delta Y_{measure}$ by the lateral offset modification measure $O_Y$.

However, in other embodiments of the method, another parameter and/or measure may be used for determining the direction of travel of the vehicle. Purely by way of example, it is envisaged that embodiments may use the lateral offset modification measure $O_Y$ as such as a target value and direction of travel may thus be determined in order to arrive at a direction of travel wherein the measured lateral offset $\Delta Y_{measure}$ is close to the lateral offset modification measure $O_Y$. As a non-limiting example, the direction of travel may be determined such that the difference between the measured lateral offset $\Delta Y_{measure}$ and the lateral offset modification measure $O_Y$ is below a predetermined threshold value.

In FIG. 3, the following vehicle 10 and the target vehicle 12 are travelling in a circle 32 with a radius R. There is a relative longitudinal distance $\Delta X$ between the following vehicle 10 and the target vehicle 12.

In FIG. 3, when the following vehicle 10 and the target vehicle 12 are traveling on the circle 32, the following vehicle 10 should preferably be controlled such that a certain lateral offset is maintained between the two vehicles 10, 12 in order to ensure that the following vehicle's reference point 22 follows the path of the target vehicle's reference point 24. This certain lateral offset is the lateral offset modification measure $O_Y$.

If a measured lateral offset $\Delta Y_{measure}$ is different from the lateral offset modification measure $O_Y$, this is an indication that the following vehicle 10 may be deviating from the path of the target vehicle 12. As such, the value of the modified lateral offset $\Delta Y_{mod}$ is generally an indication of to what extent the following vehicle 10 will follow the path of the target vehicle 12. Consequently, the following vehicle 10 is preferably automatically controlled, for instance by automatically controlling the steering angle thereof, in order to obtain a modified lateral offset $\Delta Y_{mod}$ value that is below a predetermined threshold value.

Figure 4:
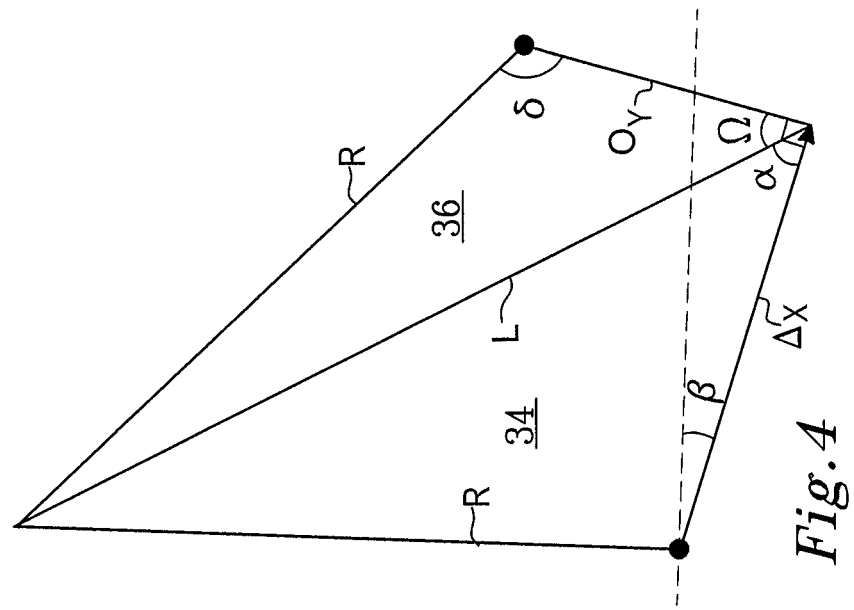
FIG. 4 illustrates a geometry analysis of the FIG. 3 traffic situation.

With reference to FIG. 4, the following vehicle 10 travels along the tangent of the circle 32 with a heading $\beta$ relative to a tangent of the circle 32. It should be noted that the radius R of the circle 32 illustrated in FIG. 3 and FIG. 4 is smaller than what would be the case during a normal traffic situation. It should be noted that it is envisaged that the relation of $R > 100\Delta Y$ could generally be considered as being a more realistic traffic scenario.

FIG. 4 further illustrates that the radius R of the circle 32, the relative longitudinal distance $\Delta X$ and the lateral offset modification measure $O_Y$ may be used for forming a left triangle 34 and a right triangle 36. The two triangles 34, 36 together form a tetragon the lower right angle of which is right-angled such that:

$$\Omega + \alpha = \pi/2 \Leftrightarrow \cos \alpha = \sin \Omega \qquad \text{(Eq. 1)}$$

The rule of sines for the right triangle 36 shows that:

$$\frac{\sin \sigma}{L} = \frac{\sin \Omega}{R} \qquad \text{(Eq. 2)}$$

Combining Eq. 1 and Eq. 2, the following expression is obtained:

$$R \sin \sigma = L \cos \alpha \qquad \text{(Eq. 3)}$$

The rule of cosines for the left triangle shows that $$L^2 = R^2 + \Delta X^2 - 2R\Delta X \cos(\pi/2 + \beta) = R^2 + \Delta X^2 + 2R\Delta X \sin\beta \qquad \text{(Eq. 4)}$$

$$\cos\alpha = \frac{\Delta X^2 + L^2 - R^2}{2\Delta XL} \qquad \text{(Eq. 5)}$$

Combining equations (Eq. 3), (Eq. 4) and (Eq. 5) shows that:

$$R\sin\sigma = \frac{\Delta X^2 + L^2 - R^2}{2\Delta X} = \qquad \text{(Eq. 6)}$$
$$\frac{\Delta X^2 + R^2 + \Delta X^2 + 2R\Delta X \sin\beta - R^2}{2\Delta X} = \Delta X + R\sin\beta$$

$$R\cos\sigma = \qquad \text{(Eq. 7)}$$
$$\pm \sqrt{R^2 - (\Delta X + R\sin\beta)^2} = \pm \sqrt{R^2 \cos^2\beta - \Delta X^2 - 2R\Delta X \sin\beta}$$

From equation (Eq. 6) we can extract $\Delta X$ $$\Delta X = R(\sin \sigma - \sin \beta) = R(\sin \sigma + \cos(\pi/2 + \beta)) \qquad \text{(Eq. 8)}$$

And by symmetry, the following expression is obtained:

$$O_y = R(\sin(\pi/2 + \beta) + \cos \sigma) = R(\cos \beta + \cos \sigma) \qquad \text{(Eq. 9)}$$

Inserting equation (Eq. 7) into (Eq. 9) results in:

$$O_y = R\cos\beta \pm \sqrt{R^2\cos^2\beta - \Delta X^2 - 2R\Delta X\sin\beta} = \quad \text{(Eq. 10)}$$
$$R\cos\beta\left[1 - \sqrt{1 - \frac{\Delta X^2}{R^2\cos^2\beta} - \frac{2\Delta X\tan\beta}{R\cos\beta}}\right]$$

As may be realized from Eq. 10 hereinabove, the value of the lateral offset modification measure $O_Y$ may be dependent on the radius R of the circle 32 as well as the heading β. Purely by way of example, an estimate of the radius R of the circle 32 and the cosine of the heading β may be formulated according to the following:

$$R\cos\beta = \frac{v\cos\beta}{\dot\psi} = \frac{v_x}{\dot\psi} \quad \text{(Eq. 11)}$$

wherein v is the velocity of the following vehicle 10, the target vehicle 12 or a combination thereof and $\dot\psi$ denotes the yaw rate of the following vehicle 10, the target vehicle 12 or a combination thereof.

Equations (Eq. 10) and (Eq. 11) gives the lateral tracking offset as $$O_y = \frac{v_x}{\dot\psi}\left[1 - \sqrt{1 - \frac{\Delta X^2 \dot\psi^2}{v_x^2} - \frac{2\Delta X\dot\psi v_y}{v_x^2}}\right] \quad \text{(Eq. 12)}$$

If the turning radius is large compared to inter-vehicle spacing, the above square root can be approximated such that:

$$O_y \approx \frac{v_x}{\dot\psi}\left[\frac{\Delta X^2 \dot\psi^2}{2v_x^2} + \frac{\Delta X\dot\psi v_y}{v_x^2}\right] = \frac{\Delta X}{v_x}\left(\frac{\Delta X\dot\psi}{2} + v_y\right) \quad \text{(Eq. 13)}$$

As such, once the measured lateral offset $\Delta Y_{measure}$ and the lateral offset modification measure $O_Y$ have been determined, a modified lateral offset $\Delta Y_{mod}$ may be determined according to $\Delta Y_{mod} = \Delta Y_{measure} - O_Y$. Thus, a steering angle of the following vehicle 10 may be set such that the modified lateral offset $\Delta Y_{mod}$ is below a predetermined threshold value and preferably is close to zero.

When studying e.g. Eq. 10 and the approximation thereof in Eq. 13, it is noted that the lateral offset modification measure $O_Y$ in Eq. 1 may be divided into two portions $O_{Y,1}$ and $O_{Y,2}$; wherein the first portion $O_{Y,1}$ is indicative of at least a slip value and the second portion $O_{Y,2}$ is indicative of at least a curve radius R, viz:

$$O_{Y,1} \approx \frac{\Delta X v_y}{v_x} \quad \text{(Eq. 14)}$$

$$O_{Y,2} \approx \frac{\Delta X^2 \dot\psi}{2v_x} \quad \text{(Eq. 15)}$$

It should also be noted that the lateral discrepancy between the following vehicle's 10 path and the target vehicle's 12 path, is reduced even if only one of the two portions $O_{Y,1}$, $O_{Y,2}$ of the offset modification measure $O_Y$ is taken into account when determining a direction of travel, for instance by automatically setting the steering angle, of the following vehicle 10.

As such, an embodiment of the method of the present disclosure comprises determining a first portion $O_{Y,1}$ of the lateral offset modification measure $O_Y$ which first portion $O_{Y,1}$ is indicative of a slip value comprising a slip angle of the following vehicle, a slip angle of the target vehicle, or a combination thereof.

Generally, the slip angle may be defined as the angle between the actual direction of a rolling wheel and the direction towards which the wheel is pointing.

Purely by way of example, the slip value may be determined in accordance with the following:
- determining a longitudinal distance $\Delta X$ between the following vehicle 12 and the target vehicle 10;
- determining a longitudinal velocity value $v_x$ comprising a longitudinal velocity of the following vehicle 10, a longitudinal velocity of the target vehicle 12 or a combination thereof;
- determining a lateral velocity value $v_y$ comprising a lateral velocity of the following vehicle, a lateral velocity of the target vehicle or a combination thereof;
- determining a first portion $O_{Y,1}$ of the lateral offset modification measure by using a first modification relation comprising the following parameters: the longitudinal distance, the longitudinal velocity value and a lateral velocity value.

Purely by way of example, the first portion $O_{Y,1}$ of the lateral offset modification measure $O_Y$ may be determined by using the following formula:

$$O_{Y,1} = \Delta x \cdot \frac{v_y}{v_x}.$$

Moreover, if a modified lateral offset is to be determined, the modified lateral offset may be modified by subtracting first portion of the lateral offset modification measure $O_{Y,1}$ from the measured lateral offset.

Instead of, or in addition to using the first portion first portion $O_{Y,1}$ of the lateral offset modification measure $O_Y$, an embodiment of the method of the present disclosure comprises determining a second portion $O_{Y,2}$ of the lateral offset modification measure $O_Y$, which second portion $O_{Y,2}$ is indicative of a curve radius R of a curve which at least one of the following vehicle 10 and the target vehicle 12 follows.

Purely by way of example, the value indicative of the curve radius R may be determined in accordance with the following:
- determining a yaw rate value comprising a yaw rate of the following vehicle, a yaw rate of the target vehicle or a combination thereof;
- determining a second portion of the lateral offset modification measure by using a second modification relation comprising the following parameters: the yaw rate value, the longitudinal distance and the longitudinal velocity value, and
- determining a modified lateral offset by modifying the measured lateral offset by the second portion of the lateral offset modification measure.

Purely by way of example, the second portion of the lateral offset modification measure may be determined by using the following formula:

$$O_{Y,2} = \frac{(\Delta x)^2 \cdot \dot{\psi}}{2 \cdot v_x}.$$

Moreover, if a modified lateral offset is to be determined, the modified lateral offset may be modified by subtracting the second portion of the lateral offset modification measure $O_{Y,2}$ from the measured lateral offset.

It should be noted that, in order to make the above derivation more easy to follow, the above equations have been derived on the basis of the assumptions that the reference point 22 of the following vehicle 10 is coincident with the centre of rotation of the following vehicle 10 and that the reference point 24 of the target vehicle 12 is coincident with the centre of rotation of the target vehicle 12. However, it should be emphasized that such assumptions are not at all limiting for the direction determination method of the present disclosure.

On the contrary, it is quite possible to calculate a desired lateral offset, $O_Y$, from any reference point 22 of the following vehicle 10 to any reference point 24 of the target vehicle 12. Purely by way of example, assume that the following vehicle's reference point 22 is located at a longitudinal distance $L_{FX}$ and at a lateral distance $L_{FY}$ from the sensor origin. Also assume that our target reference point is located at a distance $L_{TX}$ in target longitudinal direction and $L_{TY}$ in target lateral direction from the point of measurement on the target vehicle 12.

In the above example, the lateral offset used in $O_Y$ from (Eq. 10) used in $Y_{mod}$ will be modified according to:

$$O_y = R\cos\beta \left[ 1 - \sqrt{1 - \frac{\Delta X'^2}{R^2\cos^2\beta} - \frac{2\Delta X' \tan\beta}{R\cos\beta}} \right] - \quad \text{(Eq. 16)}$$
$$L_{FY} - L_{TY}\cos(\Delta\psi) - L_{TX}\sin(\Delta\psi)$$

where $$\Delta X' = \Delta X_{measured} + L_{FX} + L_{TX}\cos(\Delta\psi) - L_{TY}\sin(\Delta\psi) \quad \text{(Eq. 17)}$$

It should be noted that the radius R in Eq. 16 denotes the curve radius of the curve that the reference point 22, 24 will follow. As another example, the reference point 22 for the following vehicle 10 may be coincident with the center of rotation of the following vehicle 10, and the sensor origin is in the present example located at a position $L_{FX}=L_S$ in front of the center of rotation ($L_{FY}=0$). Further, in the present example, the reference point 24 of the target vehicle 12 is the center of rotation thereof and is positioned at $L_{TX}=L_M$ in front of the measurement point ($L_{TY}=0$).

Then the equation will be modified according to:

$$O_y = R\cos\beta \left[ 1 - \sqrt{1 - \frac{(\Delta X_{measured} + L_S + L_M\cos(\Delta\psi))^2}{R^2\cos^2\beta} - \frac{2(\Delta X_{measured} + L_S + L_M\cos(\Delta\psi))\tan\beta}{R\cos\beta}} \right] - \quad \text{(Eq. 18)}$$
$$L_M\sin(\Delta\psi)$$

Figure 5:
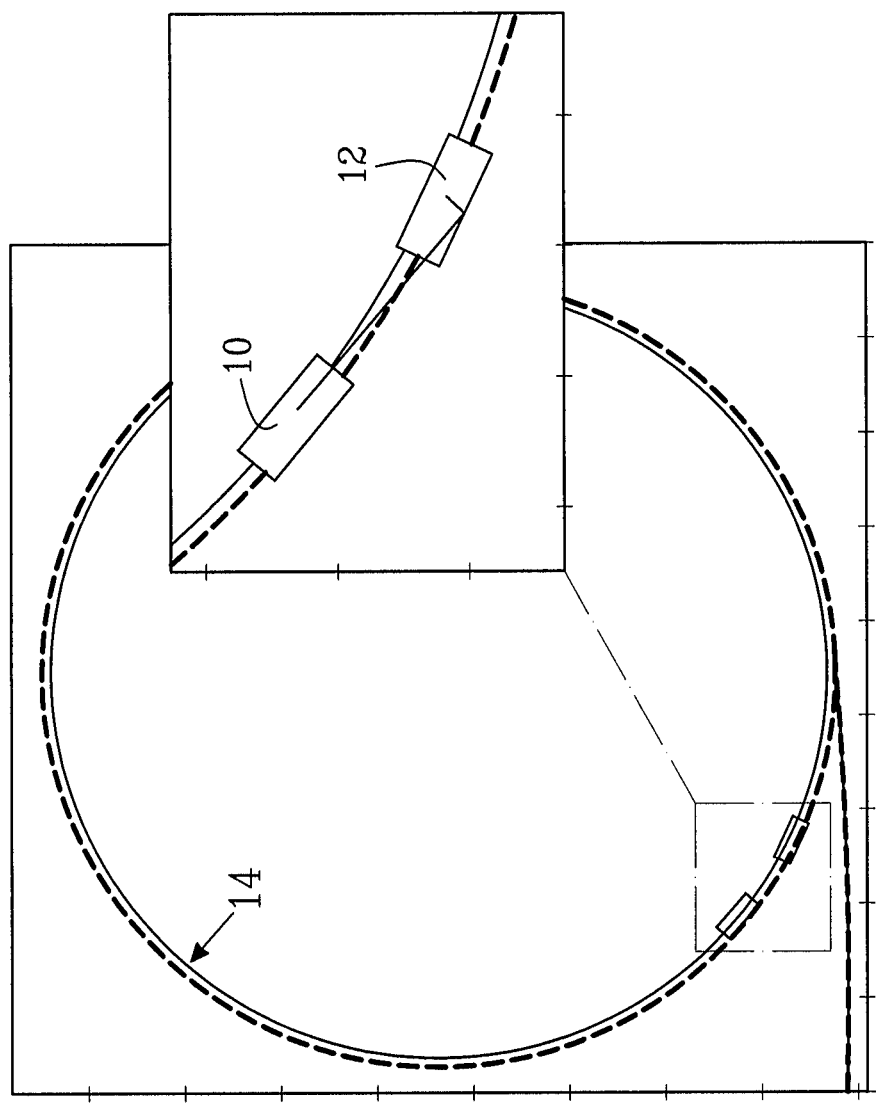
FIG. 5 illustrates a traffic situation for a following vehicle and a target vehicle.

FIG. 5 illustrates a traffic situation in which a following vehicle 10 follows a target vehicle 12 on a circular road 14. The following vehicle 10 in FIG. 5 utilizes a target following method that does not take a performed and/or ongoing and/or impending lateral position change of the following vehicle and/or the target vehicle into account. Instead, the method used in the FIG. 5 scenario merely determines the longitudinal and lateral distances between the following vehicle 10 and the target vehicle 12 and the method then adjusts the steering angle of the following vehicle 10 in order to obtain a zero, or at least close to zero, lateral distance between the two vehicles 10, 12.

Figure 6:
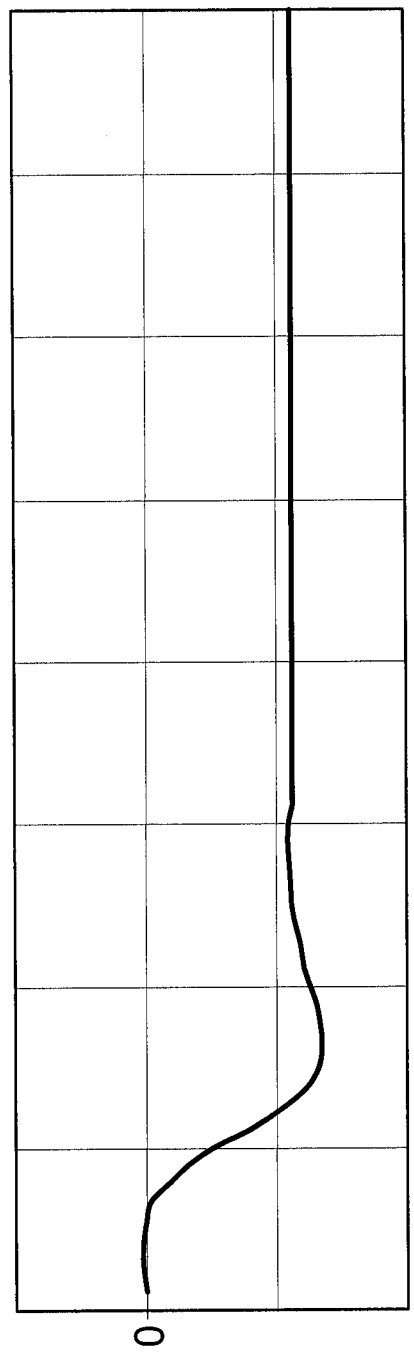
FIG. 6 illustrates the lateral distance between a following vehicle's path and a target vehicle's path.

FIG. 6 illustrates the actual lateral deviation of the following vehicle 10 in relation to the path of the target vehicle 12. As may be gleaned from FIG. 6, and as is also indicated in FIG. 5, the following vehicle 10 will travel along a path that has a lateral offset in relation of the path of the target vehicle 12. As such, in the scenario illustrated in FIG. 5 and FIG. 6, the following vehicle 10 will actually travel along an inner circle, the radius of which is smaller than the circle formed by the path of the target vehicle 12.

As has been discussed hereinabove, the above discrepancy between the following vehicle's 10 path and the target vehicle's 12 path may be reduced by taking the lateral offset modification measure $O_Y$ into account when determining inter alia the steering angle of the following vehicle 10.

When determining the lateral offset modification measure $O_Y$, a parameter indicative of a performed and/or ongoing and/or impending lateral position change of the following vehicle 10 and/or target vehicle 12 or a combination thereof may be used. As has previously been discussed, the expression "combination" is intended to encompass any linear and/or non-linear combination of the parameter indicative of the performed and/or ongoing and/or impending lateral position change of the following vehicle 10 and the target vehicle 12.

Figure 7:
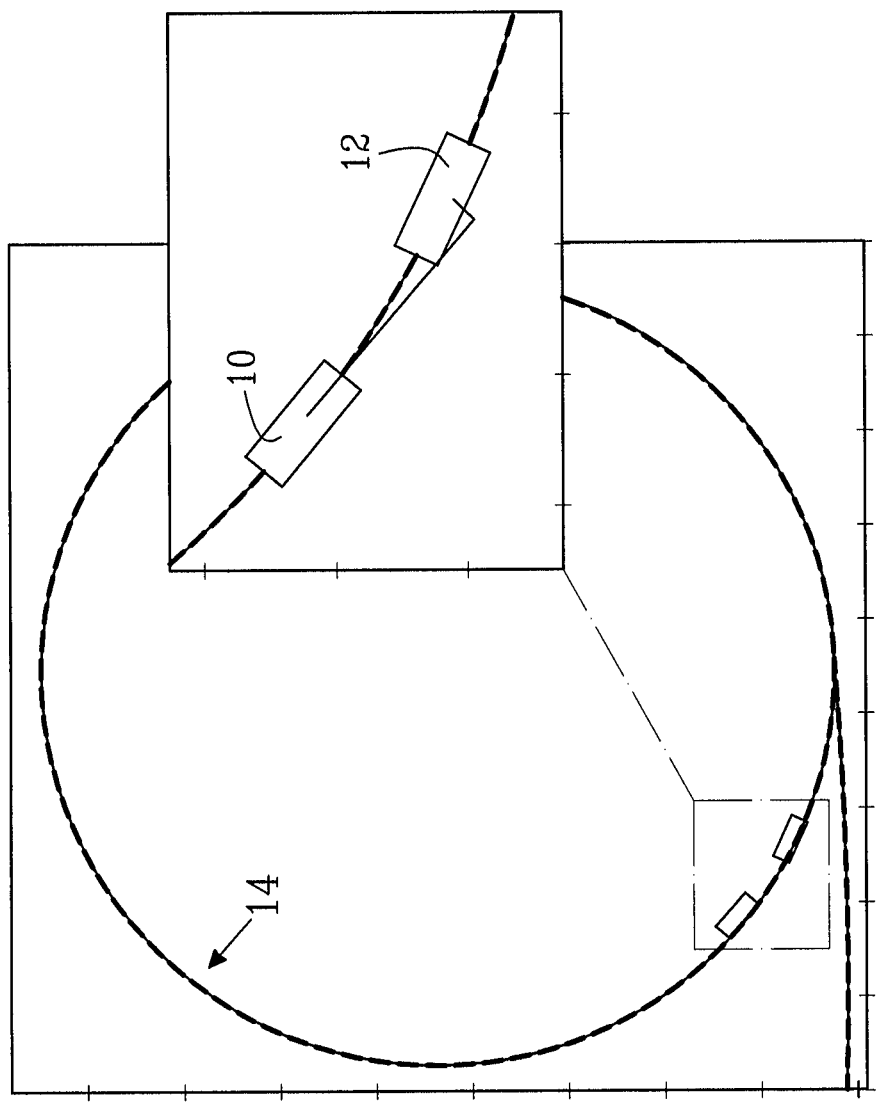
FIG. 7 illustrates a traffic situation for a following vehicle and a target vehicle.

FIG. 7 illustrates a scenario in which a lateral offset modification measure $O_Y$, calculated according to one of the above embodiments, has been used when determining a direction of travel for a following vehicle 10. As may be realized from FIG. 7, in particular when comparing the path of the FIG. 7 following vehicle 10 with the path of the FIG. 5 following vehicle, a closer match between the paths of the following and target vehicles 10, 12 is obtained in the FIG. 7 scenario.

Figure 8:
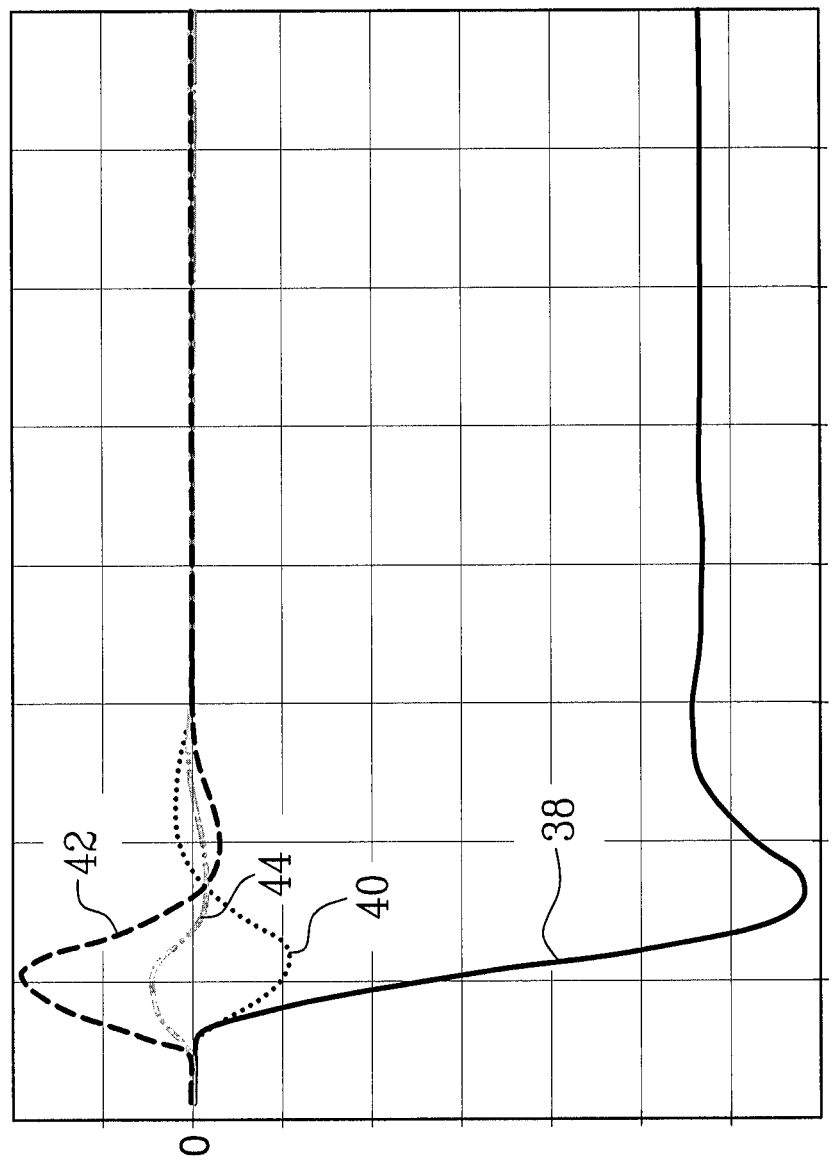
FIG. 8 illustrates the lateral distance between a following vehicle's path and a target vehicle's path for various embodiments of the present disclosure.

FIG. 8 is a graph illustrating a deviation amount, i.e. the amount that the path of the following vehicle 10 laterally deviates from the path of the target vehicle 12, as a function of time for various scenarios. Line 38 in FIG. 8 illustrates the deviation amount for the FIG. 5 scenario, i.e. without any lateral offset modification measure $O_Y$ compensation. Line 40 illustrates an embodiment of the method of the present disclosure wherein the velocity and yaw rate of the following vehicle 10 have been used when determining the lateral offset modification measure $O_Y$; line 42 illustrates an embodiment wherein the velocity and yaw rate of the target vehicle 12 has been used and line 44 illustrates an embodiment wherein a combination (an arithmetic mean in the specific example associated with line 44) of the velocities and the yaw rates of the following vehicle 10 and the target vehicle 12 has been used.

From FIG. 8, it is noted that each one of the embodiments of the present disclosure associated with the lines 40, 42, 44 presents an appropriately small deviation amount, be it that the three embodiments have somewhat different transients before reaching a steady state with relatively constant, and relatively small, deviation amounts. It is also noted that each one of the above three embodiments associated with the lines 40, 42, 44 presents a deviation amount that is significantly smaller that the deviation amount obtained when the FIG. 5 method (without the lateral offset modification measure $O_Y$ compensation) is used.

While there have been shown and described and pointed out fundamental novel features of the disclosure as applied to a preferred embodiment thereof, it will be understood that various omissions and substitutions and changes in the form and details of the devices illustrated, and in their operation, may be made by those skilled in the art.

For example, it is expressly intended that all combinations of those elements and/or method steps which perform substantially the same function in substantially the same way to achieve the same results are within the scope of the disclosure.

Moreover, it should be recognized that structures and/or elements and/or method steps shown and/or described in connection with any disclosed form or embodiment of the disclosure may be incorporated in any other disclosed or described or suggested form or embodiment as a general matter of design choice. It is the intention, therefore, to be defined only as indicated by the scope of the claims appended hereto.

What is claimed is:

1. A method for determining a direction of travel for a following vehicle in order to ensure that said following vehicle follows a path that is indicative of a vehicle path of a target vehicle, said target vehicle extending in a longitudinal direction (X) and a lateral direction (Y), wherein said longitudinal direction (X) corresponds to an intended direction of travel of said following vehicle, said method comprising:
receiving a signal from a sensor assembly mounted on said following vehicle adapted to locate said target vehicle;
determining a measured lateral offset ($\Delta Y_{measure}$) between said following vehicle and said target vehicle;
measuring at least one lateral position change parameter corresponding to any of an actual performed lateral position change of said following vehicle, an ongoing lateral position change of said following vehicle, an impending lateral position change of said following vehicle, an actual performed lateral position change of said target vehicle, an ongoing lateral position change of said target vehicle, and an impending lateral position change of said target vehicle;
determining a lateral offset modification measure ($O_Y$) using said at least one lateral position change parameter;
using said measured lateral offset ($\Delta Y_{measure}$) and said lateral offset modification measure ($O_Y$) to determine said direction of travel; and
generating a signal to adjust a steering angle of said following vehicle based on said direction of travel determined.

2. The method according to claim 1 further comprising:
determining a first portion ($O_{Y,1}$) of said lateral offset modification measure ($O_Y$), which first portion ($O_{Y,1}$) is indicative of a slip value comprising a slip angle of the following vehicle, a slip angle of the target vehicle, or a combination thereof.

3. The method according to claim 2 further comprising:
determining a longitudinal distance ($\Delta X$) between said following vehicle and said target vehicle;
determining a longitudinal velocity value ($v_x$) comprising a longitudinal velocity of said following vehicle, a longitudinal velocity of said target vehicle or a combination thereof;
determining a lateral velocity value ($v_y$) comprising a lateral velocity of said following vehicle, a lateral velocity of said target vehicle or a combination thereof; and
determining a first portion ($O_{Y,1}$) of said lateral offset modification measure ($O_Y$) by using a first modification relation comprising the following parameters: said longitudinal distance ($\Delta X$), said longitudinal velocity value ($v_x$) and said lateral velocity value ($v_y$).

4. The method according to claim 3 further comprising:
determining said first portion of said lateral offset modification measure by using the following formula:

$$O_{Y,1} = \Delta x \cdot \frac{v_y}{v_x}.$$

5. The method according to claim 1 further comprising:
determining a second portion ($O_{Y,2}$) of said lateral offset modification measure ($O_Y$) which second portion ($O_{Y,2}$) is indicative of a curve radius (R) of a curve which at least one of the following vehicle and the target vehicle follows.

6. The method according to claim 5 further comprising:
determining a yaw rate value ($\dot{\psi}$) comprising a yaw rate of said following vehicle, a yaw rate of said target vehicle or a combination thereof; and
determining a second portion ($O_{Y,2}$) of said lateral offset modification measure by using a second modification relation comprising the following parameters: said yaw rate value ($\dot{\psi}$), said longitudinal distance ($\Delta X$) and said longitudinal velocity value ($v_x$).

7. The method according to claim 6 further comprising:
determining said second portion of said lateral offset modification measure by using the following formula:

$$O_{Y,2} = \frac{(\Delta x)^2 \cdot \dot{\psi}}{2 \cdot v_x}.$$

8. The method according to claim 6, wherein said target vehicle comprises means for transmitting a yaw rate signal ($\dot{\psi}$) indicative of said yaw rate of said target vehicle to one or more receivers located outside said target vehicle, the method further comprising:
receiving said yaw rate signal to thereby determine said yaw rate ($\dot{\psi}$) of said target vehicle.

9. The method according to claim 1 further comprising:
determining a modified lateral offset ($\Delta Y_{mod}$) by modifying said measured lateral offset ($\Delta Y_{measure}$) by said lateral offset modification measure ($O_Y$); and
automatically adjusting said direction of travel for said following vehicle in order to ensure that said modified lateral offset is reduced.

10. The method according to claim 9 further comprising:
automatically adjusting said direction of travel for said following vehicle in order to ensure that said modified lateral offset is reduced to a value below a predetermined threshold value.

11. The method according to claim 9 further comprising:
automatically adjusting a steering angle of said following vehicle.

12. A non-transitory storage medium having computer readable instructions stored thereon for determining a direction of travel for a following vehicle in order to ensure that said following vehicle follows a path that is indicative of a vehicle path of a target vehicle, said target vehicle extending in a longitudinal direction (X) and a lateral direction (Y), wherein said longitudinal direction (X) corresponds to an intended direction of travel of said following vehicle, said instructions comprising instructions for:
receiving a signal from a sensor assembly mounted on said following vehicle adapted to locate said target vehicle;
determining a lateral offset ($\Delta Y_{measure}$) between said following vehicle and said target vehicle;

determining at least one lateral position change parameter corresponding to at least one of i) one of a performed, ongoing and impending lateral position change of said following vehicle, and ii) one of a performed, ongoing and impending lateral position change of said target vehicle;

determining a lateral offset modification ($O_Y$) using said at least one lateral position change parameter;

using said lateral offset ($\Delta Y_{measure}$) and said lateral offset modification ($O_Y$) when determining said direction of travel;

generating a signal to adjust a steering angle of said following vehicle based on said direction of travel determined.

13. The storage medium of claim 12, wherein said instructions further comprise instructions for:

determining a first portion ($O_{Y,1}$) of said lateral offset modification ($O_Y$), which first portion ($O_{Y,1}$) is indicative of a slip value comprising at least one of a slip angle of the following vehicle and a slip angle of the target vehicle.

14. The storage medium of claim 13, wherein said instructions further comprise instructions for:

determining a longitudinal distance ($\Delta X$) between said following vehicle and said target vehicle;

determining a longitudinal velocity value ($v_x$) comprising a longitudinal at least one of a velocity of said following vehicle and a longitudinal velocity of said target vehicle;

determining a lateral velocity value ($v_y$) comprising at least one of a lateral velocity of said following vehicle and a lateral velocity of said target vehicle; and determining a first portion ($O_{Y,1}$) of said lateral offset modification ($O_Y$) by using a first modification relation based on said longitudinal distance ($\Delta X$), said longitudinal velocity value ($v_x$) and said lateral velocity value ($v_y$).

15. The storage medium of claim 14 wherein said instructions further comprise instructions for:

determining said first portion of said lateral offset modification using the formula:

$$O_{Y,1} = \Delta x \cdot \frac{v_y}{v_x}.$$

16. A system for determining a direction of travel for a following vehicle in order to ensure that said following vehicle follows a path that is indicative of a vehicle path of a target vehicle, said target vehicle extending in a longitudinal direction (X) and a lateral direction (Y), wherein said longitudinal direction (X) corresponds to an intended direction of travel of said following vehicle, said system comprising a controller configured to:

receive a signal from a sensor assembly mounted on said following vehicle adapted to locate said target vehicle;

determine a lateral offset ($\Delta Y_{measure}$) between said following vehicle and said target vehicle;

determine at least one lateral position change parameter corresponding to at least one of i) one of a performed, ongoing and impending lateral position change of said following vehicle, and ii) one of a performed, ongoing and impending lateral position change of said target vehicle;

determine a lateral offset modification ($O_Y$) using said at least one lateral position change parameter;

use said lateral offset ($\Delta Y_{measure}$) and said lateral offset modification ($O_Y$) to determine said direction of travel;

generate a signal to adjust a steering angle of said following vehicle based on said direction of travel determined.

17. The system of claim 16, wherein said controller is further configured to:

determine a first portion (OY,1) of said lateral offset modification (OY), which first portion (OY,1) is indicative of a slip value comprising at least one of a slip angle of the following vehicle and a slip angle of the target vehicle.

18. The system of claim 17, wherein said controller is further configured to:

determine a longitudinal distance ($\Delta X$) between said following vehicle and said target vehicle;

determine a longitudinal velocity value ($v_x$) comprising a longitudinal at least one of a velocity of said following vehicle and a longitudinal velocity of said target vehicle;

determine a lateral velocity value ($v_y$) comprising at least one of a lateral velocity of said following vehicle and a lateral velocity of said target vehicle; and determine a first portion ($O_{Y,1}$) of said lateral offset modification ($O_Y$) by using a first modification relation based on said longitudinal distance ($\Delta X$), said longitudinal velocity value ($v_x$) and said lateral velocity value ($v_y$).

19. The system of claim 18 wherein said controller is further configured to: determine said first portion of said lateral offset modification using the formula:

$$O_{Y,1} = \Delta x \cdot \frac{v_y}{v_x}.$$

20. The system of claim 16 wherein said controller is further configured to:

determine a modified lateral offset ($\Delta Y_{mod}$) by modifying said lateral offset ($\Delta Y_{measure}$) by said lateral offset modification ($O_Y$); and automatically adjust said direction of travel for said following vehicle in order to ensure that said modified lateral offset is reduced.

* * * * *

UNITED STATES PATENT AND TRADEMARK OFFICE
CERTIFICATE OF CORRECTION

PATENT NO.       : 9,020,680 B2               Page 1 of 1
APPLICATION NO.  : 13/781958
DATED            : April 28, 2015
INVENTOR(S)      : Stefan Solyom et al.

It is certified that error appears in the above-identified patent and that said Letters Patent is hereby corrected as shown below:

In the Claims

Column 15, Line 11, Claim 12:

After "determining said direction of travel"
Insert -- and --.

Signed and Sealed this
Seventeenth Day of May, 2016

Michelle K. Lee
*Director of the United States Patent and Trademark Office*